Patented Nov. 28, 1922.

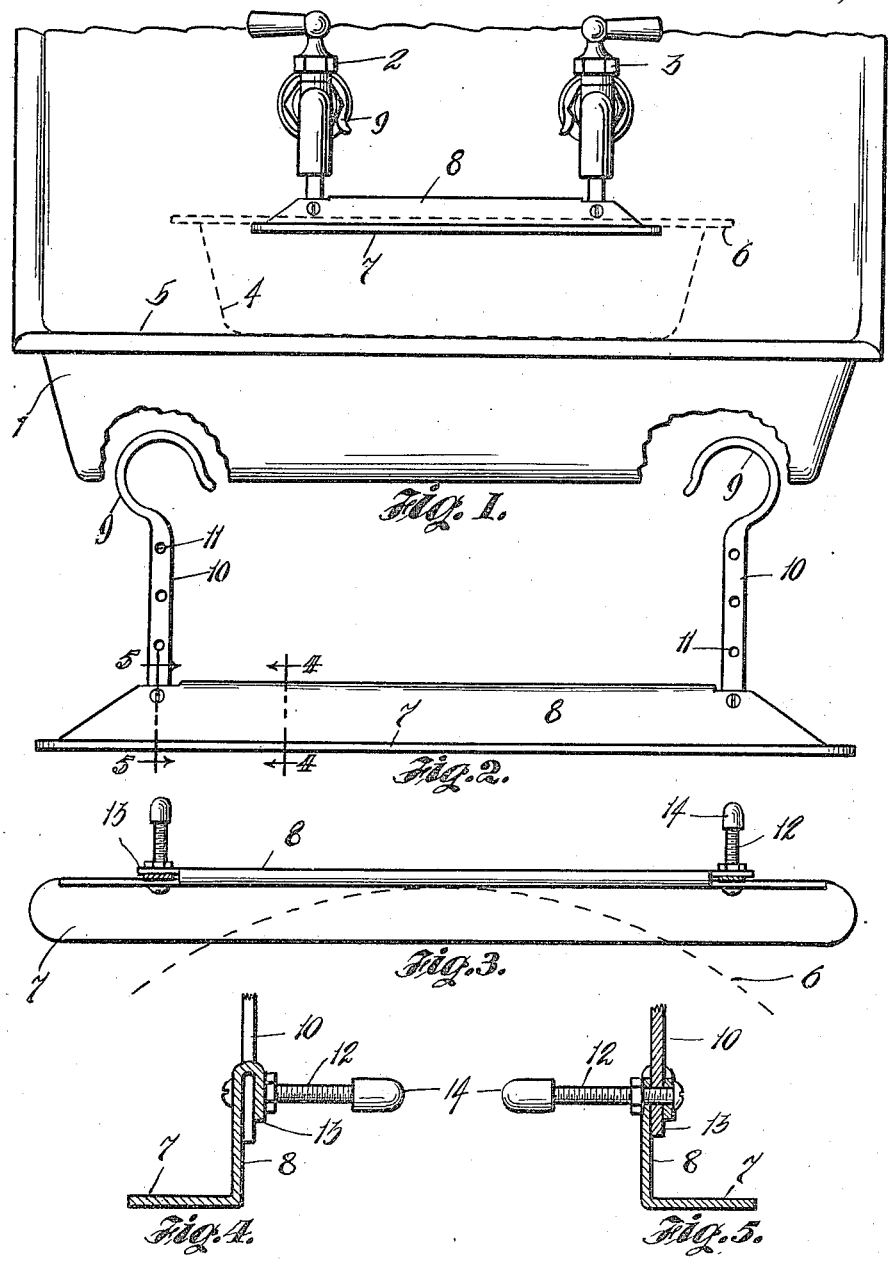

1,436,972

UNITED STATES PATENT OFFICE.

JOHN W. McHAM, OF DALLAS, TEXAS, ASSIGNOR OF ONE-HALF TO HENRY G. DANNELLY, OF DALLAS, TEXAS.

SINK ATTACHMENT FOR HOLDING DISHPANS.

Application filed February 9, 1922. Serial No. 535,214.

*To all whom it may concern:*

Be it known that I, JOHN W. McHAM, a citizen of the United States, residing at Dallas, in the county of Dallas and State of Texas, have invented certain new and useful Improvements in Sink Attachments for Holding Dishpans, of which the following is a specification.

This invention relates to new and useful improvements in means for washing dishes and in such connection it relates more particularly to a support for a dish pan.

The object of the invention is to provide a means for supporting a dish pan over the ordinary kitchen sink and directly underneath the faucets as an ordinarily constructed circular shaped dish pan of sufficient diameter will not fit into the sink sufficiently to allow the pan to lie flat and there is no place to rest the pan directly underneath the faucets.

Another object of the invention is to provide a device of the character described which is very simple in construction and economical of manufacture.

These advantages and features of the invention will be fully understood by reference to the following description, taken in connection with the accompanying drawings forming part hereof in which—

Figure 1 is a front elevational view of a kitchen sink and illustrating the dish pan support in position, the dotted lines indicating the dish pan.

Figure 2 is a front elevational view of the support removed from the faucet.

Figure 3 is a top or plan view of the holder or support with dotted lines to indicate the edges of a dish pan supported thereon, and Figures 4 and 5 are cross-sectional views of the support taken on lines 4—4 and 5—5, respectively, of Figure 2.

Referring more closely to the drawings, 1 denotes a kitchen sink with hot and cold water faucets 2 and 3 and from which faucets the support is suspended the holder or support for a dish pan 4, the dish pan having its bottom edge resting upon the top edge 5 of the sink 1 and its rim 6 supported by the holder.

The dish pan support or holder is constructed of a single strip of metal with the exception of the two hooks, the strip being bent at right angles as clearly illustrated in Figures 4 and 5 so as to form a longitudinal lip or shelf 7 and upon which the circular rim of the dish pan 6 is supported, see Figures 1 and 3. To the oppositely bent side 8 of the holder at each end is pivoted a hook 9 having a shank 10 with perforations 11—11 for adjusting the holder to variable heights. The shank 10 is pivoted to the side 8 by a screw-bolt 12 which traverses the side 8 of the holder, the shank 10 and the lapped over portion or lip 13. The screw bolt 12 is sufficiently long so that when the dish pan 4 is in position the knob 14 will bear against the face of the sink and hold the shelf 7 and pan rigid. When not in use the hook and shank are swung around and under the lip 13.

What is claimed is—

1. A device for supporting dish pans in washing dishes in a sink, in combination with the sink, said device comprising a metallic shelf for holding the rim of the pan which is partly supported upon the sink, said shelf suspended from the faucets over the sink and adapted to adjustment to variable heights and means for holding the shelf rigid when in use.

2. In a device of the character described, in combination with a sink, comprising a shelf, with a back portion, suspended from the faucets over the sink, and arranged to support the rim of a dish pan, the bottom edge of the pan being supported upon the rim of the sink, adjustable means pivoted to said back portion of the shelf and removably attached to the faucets for holding the shelf in position and means for maintaining the shelf rigid when in use.

In testimony whereof I have signed my name to this specification.

JOHN W. McHAM.

Certificate of Correction.

It is hereby certified that Letters Patent No. 1,436,972, granted November 28, 1922, upon the application of John W. McHam, of Dallas, Texas, for an improvement in "Sink Attachments for Holding Dishpans," were erroneously issued to the inventor, said McHam, and one-half to Henry G. Dannelly, as assignee, whereas said Letters Patent shou'd have been issued to the inventor, said *McHam, and Henry G. Dannelly*, said Dannelly being assignee of *one-fifth* interest only in said invention, as shown by the records of assignments in this office; and that the said Letters Patent should be read with this correction therein that the same may conform to the record of the case in the Patent Office.

Signed and sealed this 16th day of October, A. D., 1923.

[SEAL.]

WM. A. KINNAN,
*Acting Commissioner of Patents.*